Patented Feb. 10, 1925.

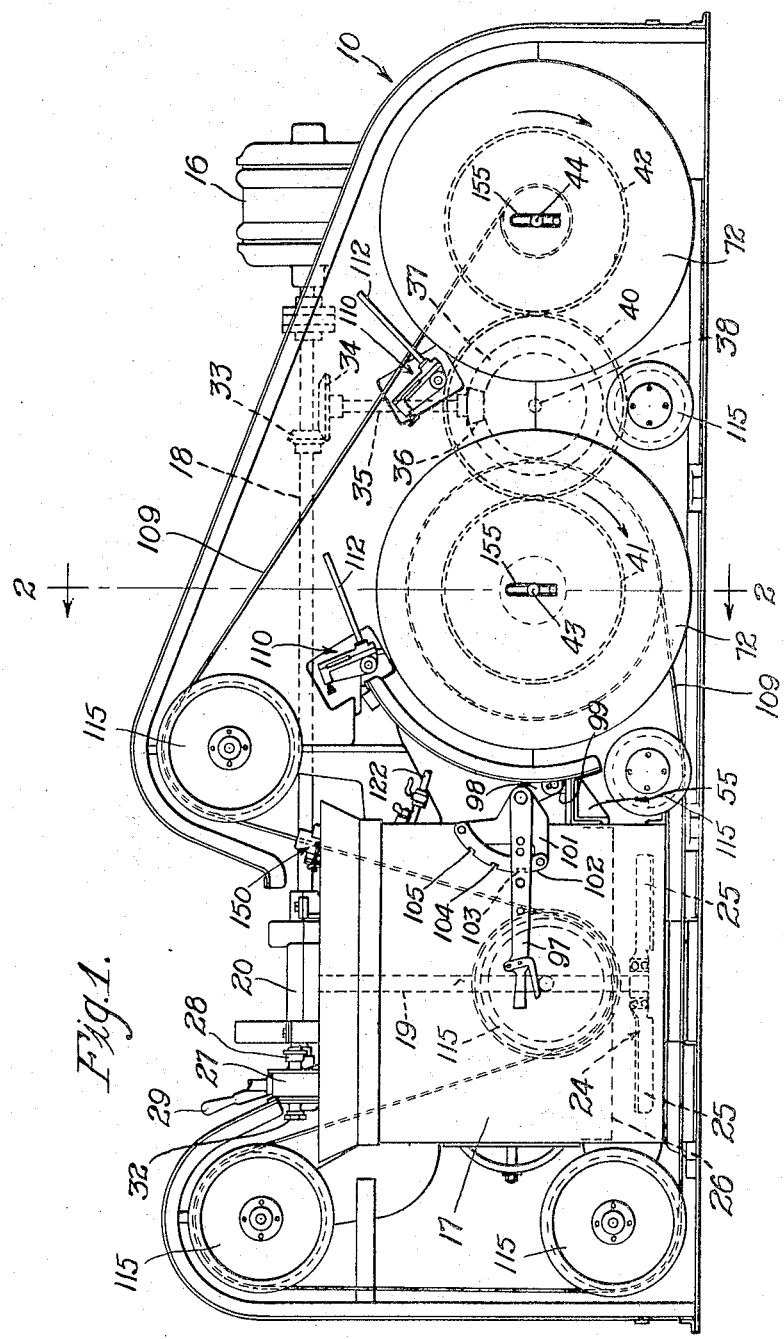

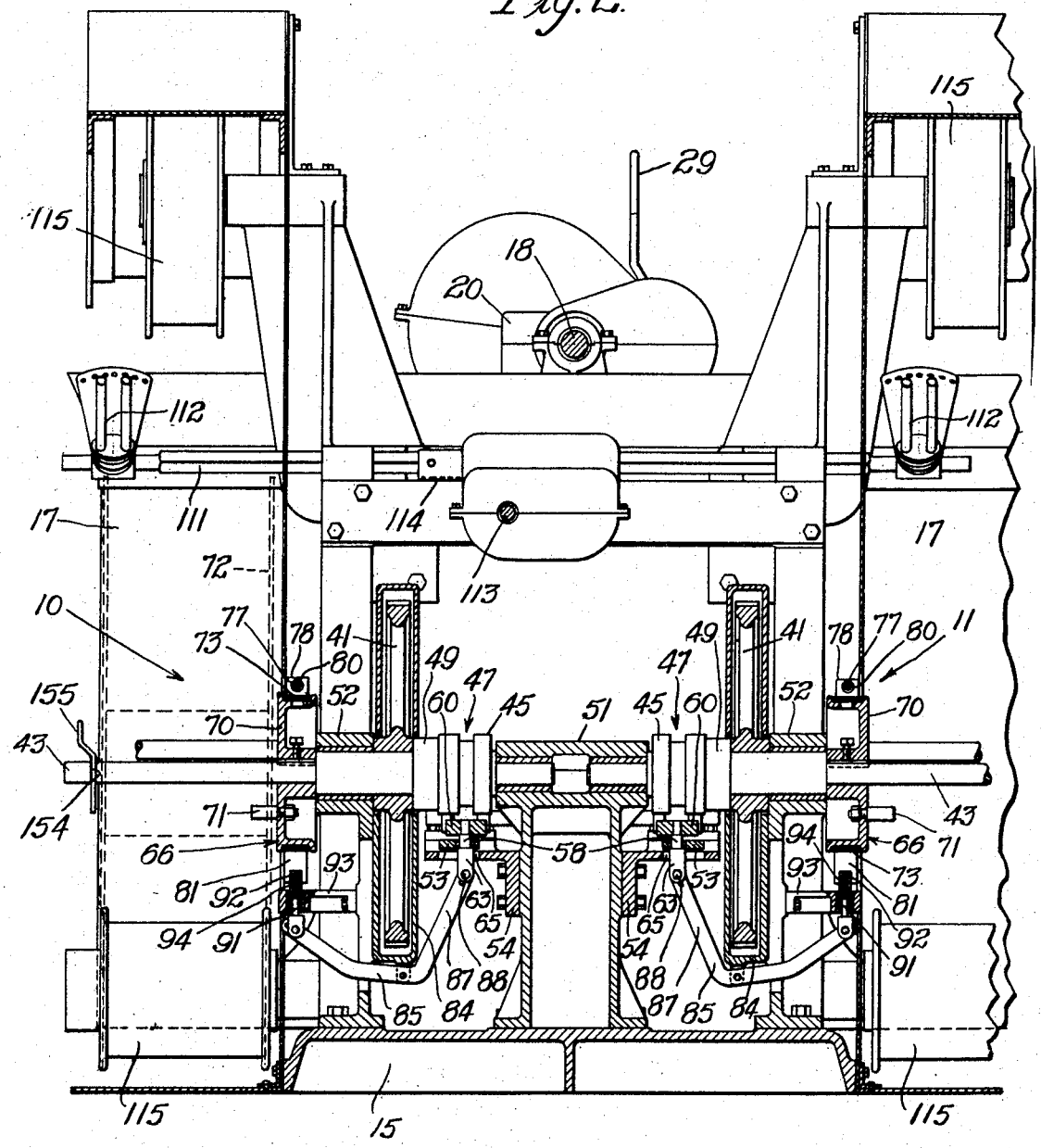

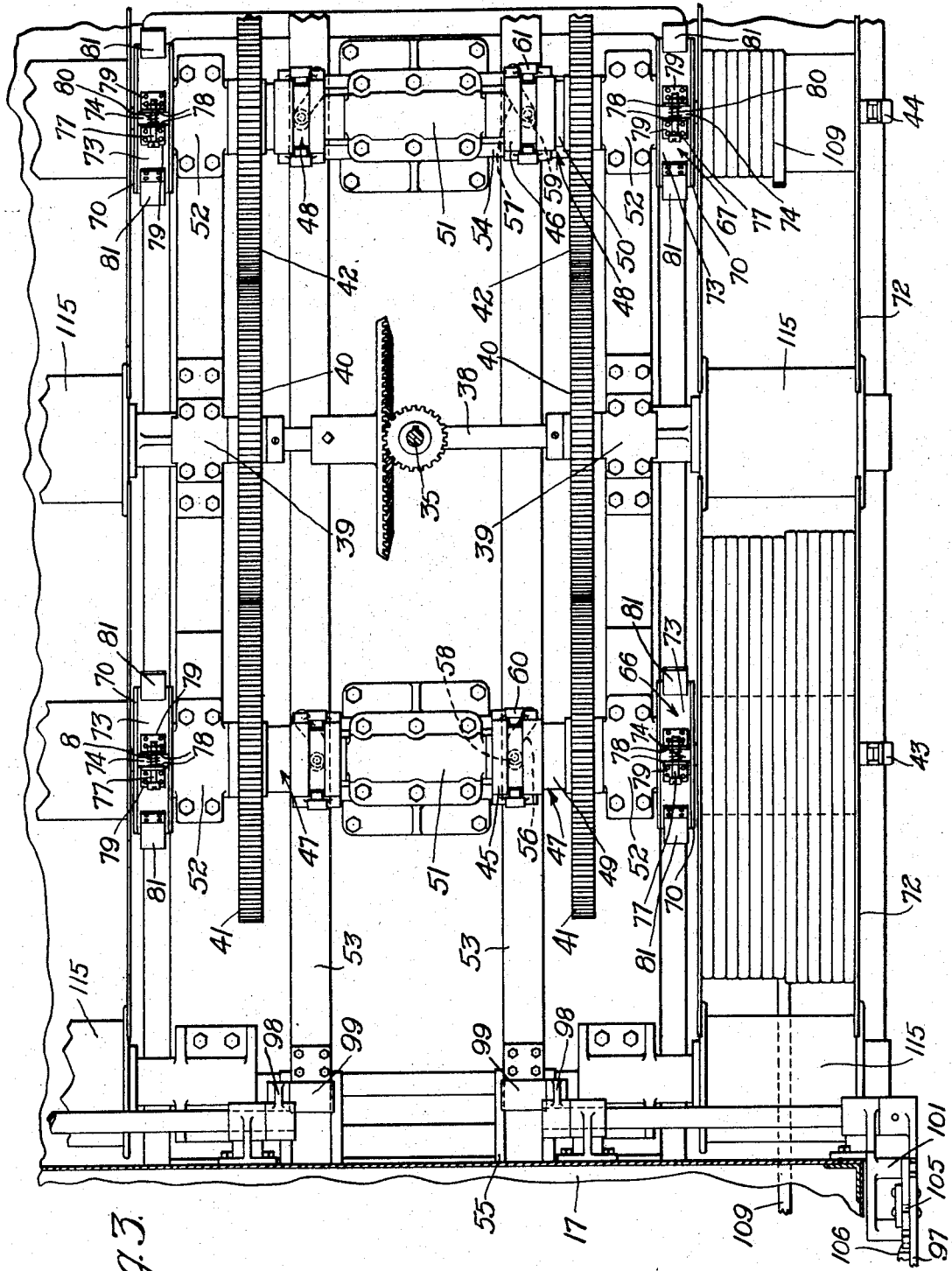

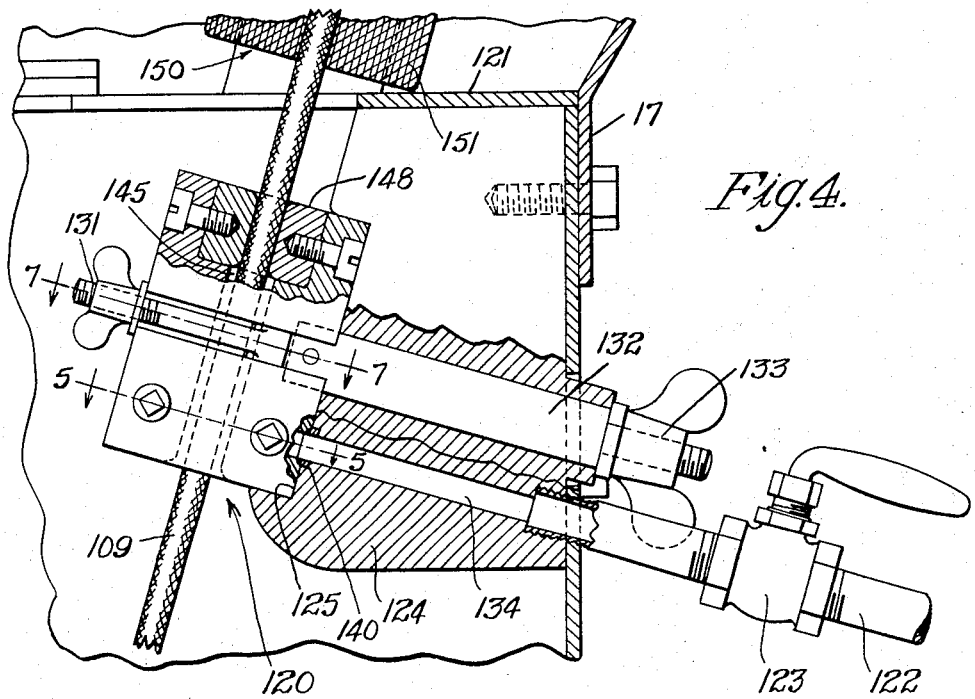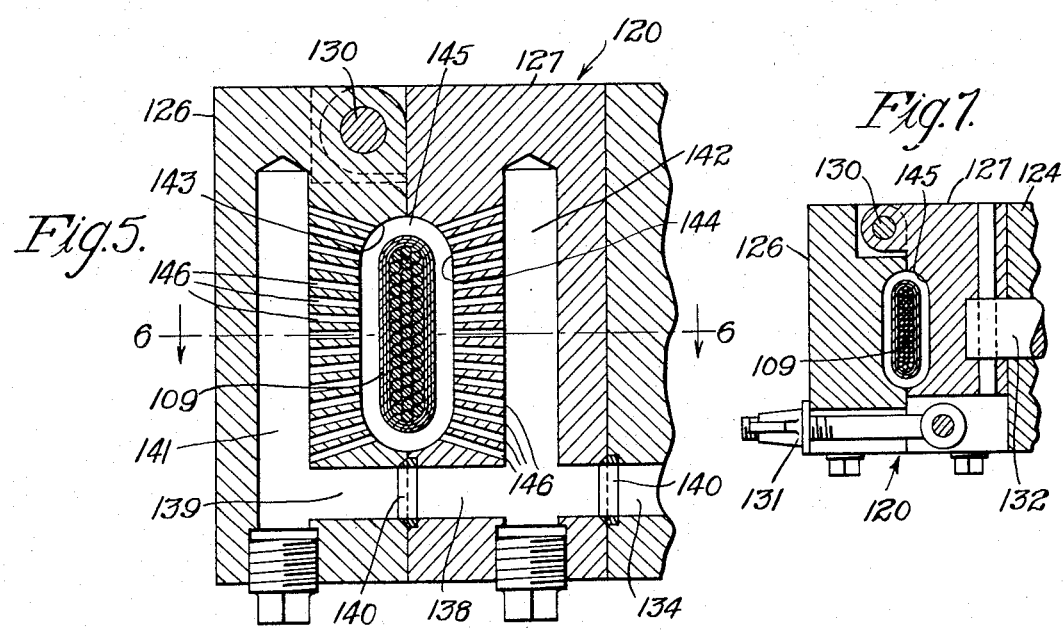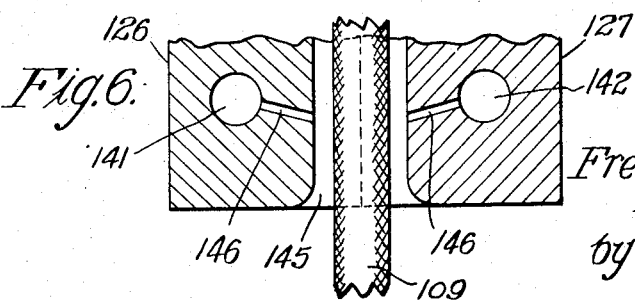

1,526,071

UNITED STATES PATENT OFFICE.

FREDERIC S. KOCHENDORFER, OF RIVER FOREST, AND HELMER J. BOE, OF CHICAGO, ILLINOIS, ASSIGNORS TO WESTERN ELECTRIC COMPANY, INCORPORATED, OF NEW YORK, N. Y., A CORPORATION OF NEW YORK.

CABLE OR STRAND HANDLING AND WORKING MECHANISM.

Application filed December 7, 1921. Serial No. 520,712.

*To all whom it may concern:*

Be it known that we, FREDERIC S. KOCHENDORFER and HELMER J. BOE, citizens of the United States, residing at River Forest, in the county of Cook and State of Illinois, and Chicago, in the county of Cook and State of Illinois, respectively, have invented certain new and useful Improvements in Cable or Strand Handling and Working Mechanism, of which the following is a full, clear, concise, and exact description.

This invention relates to a method of, and a mechanism for working and handling strands and cables, and the object of the invention in general is to provide a method of, and a mechanism for conveniently and speedily working and handling strands or cables.

In accordance with one of the features of this invention, provision is made for the economical handling of supply and take-up reels whereby the same reel may be used twice in the same mechanism without change from one spindle to another—once as a supply reel and once as a take-up reel. This may be accomplished by means of mechanism adapted to be operated to permit either spindle to be driven or to be idle, depending whether the reel upon it is a supply reel or take-up reel.

Another feature of this invention relates to the details of construction and combination of parts for controlling or actuating a driving and braking means for controlling the spindles whereby these spindles may be used for alternate purposes.

Another feature of this invention relates to reversing the functions of the reels while maintaining unchanged their direction of rotation.

Still another feature of the invention relates to reversing the functions of the reels while maintaining unchanged the direction of motion of the strand as to a predetermined point.

In the drawings:

Fig. 1 is a side elevation of a machine embodying the features of the invention;

Fig. 2 is an enlarged fragmentary vertical sectional view taken on the line 2—2 of Fig. 1;

Fig. 3 is an enlarged fragmentary plan view with parts removed;

Fig. 4 is an enlarged fragmentary sectional view of the upper right-hand corner of the paint bath as viewed in Fig. 1, showing the surplus paint removing means partially in section mounted therein;

Fig. 5 is an enlarged plan sectional view taken on the line 5—5 of Fig. 4;

Fig. 6 is a fragmentary plan sectional view taken on the line 6—6 of Fig. 5, and Fig. 7 is a plan section taken on the line 7—7 of Fig. 1.

As shown in the drawings, the machine is preferably built with two units 10 and 11 positioned back to back with a paint container and a main driving means common to both units and in the following description it will suffice if the construction and operation of one unit is described. A base or supporting member common to both units is indicated at 15, and suitably carried thereon and positioned midway between the units 10 and 11 and at one end of the machine is a driving motor 16. Positioned at the opposite end of the machine and carried upon the base member 15 is a paint container 17. A main driving shaft 18 extends from the motor 16 to the container 17 where it drives a vertically disposed shaft 19 by suitable bevel gearing located in a gear box 20. The shaft 19 extends toward the bottom of the container 17 and carries a stirring and mixing member 24 equipped with a plurality of agitator blades 25—25. The container 17 has a vertical partition or wall 26 with its lower end positioned just above the blades 25—25 to divide the container 17 into two sections, one for each unit of the machine. Positioned upon the top of the container 17 and near the end of the machine is a rotary pump 27 connected to the shaft 18 through a suitable clutch 28, the operating handle thereof being indicated at 29. The clutch 28 is connected to the main shaft 18 by suitable gearing located in the gear box 20. The purpose of the pump 27 is to facilitate the filling of the container 17 with paint from a barrel or other supply source, the paint being drawn therefrom by a hose secured to a connection 32 on the pump 27. Secured to the main driving shaft 18 near the motor 16 is a bevel pinion 33 which meshes with a bevel gear 34 secured to a vertically disposed shaft 35. (See Figs. 1 and 3.)

To the lower end of the shaft 35 is secured a bevel pinion 36 meshing with a bevel gear 37 secured on a horizontal shaft 38 supported in bearings 39, 39. The shafts 18 and 35 are supported in suitable bearings which have not been illustrated in the drawings. The shaft 38 extends toward each side of the machine and forms the driving connection for each unit with the main shaft 18. Secured to each end of the shaft 38 is a gear 40, one for driving each unit, which meshes with gears 41 and 42 at each side thereof and secured to shafts or reel spindles 43 and 44 in horizontal alinement with the shaft 38. Keyed to but slidable upon each of the spindles 43 and 44 are shiftable sections 45 and 46 which form the driven parts of suitable friction clutches 47 and 48, the driving sections 49 and 50 thereof being keyed to the gears 41 and 42 respectively. The inside ends of the reel spindles 43 and 44 are supported in bearings 51 and toward their outside ends in bearings 52. Positioned below the clutches 47 and 48 is a bar 53 slidable at one end upon a bracket 54 secured to the bearing 52 and at its other end upon a bracket 55 secured to the container 17. The bar 53 is guided in its movement upon the brackets 54 and 55 by suitable guideways formed therein. Formed in the bar 53 are cam slots 56 and 57 and passing therethrough are pins 58 and 59 which are secured at their upper ends to yoke members 60 and 61 adapted to move the shiftable sections 45 and 46 of the clutches 47 and 48 in a well-known manner to drive the spindles 43 and 44. The pins 58 and 59 are equipped with suitable anti-friction rollers which engage in the cam slots 56 and 57 and at their lower ends are forked shaped, as indicated at 63. Suitable openings 65 are formed in the brackets 54 and 55 for the movement of the fork shaped ends 63 of the pins 58 and 59. Keyed to the spindles 43 and 44 are brakes 66 and 67 comprising a brake pulley 70 equipped with a stud 71 for locking reels 72 to the spindles 43 and 44. A brake band 73 lined with a suitable lining and split at 74 passes around the periphery of the brake pulley 70 and is held in position by suitable flanges formed thereon. (See Figs. 2 and 3.) As shown in Fig. 3, the brake band is adapted to be brought into a normal frictional engagement with the brake pulley 70 by turning an adjusting bolt 77 which passes through suitable openings in radial extending arms 78 of the angle pieces 79 secured to the peripheral surface of the brake band and at the ends thereof. A compression spring 80 surrounds the bolt 77 between the arms 78 of the angle pieces 79 and tends to loosen the brake band on the brake pulley. By turning the bolt 77 on its nut in a right hand direction it will be readily seen that the ends of the friction band will be drawn closer together, thereby tightening the band upon the pulley and to loosen the band thereon when the bolt is turned vice versa. Suitably spaced and secured to the periphery of the band 73 are a plurality of angle pieces 81 similar to the angle pieces 79, the purpose of which will be described further on in this description. Pivotally secured to a housing 84 for the gears 41 and 42 are brake levers 85. (See Fig. 2.) The brake levers 85 are pivoted to the housing 84 substantially midway between their ends with one end 87 pivotally secured to the forked ends 63 of the pins 58 and 59, as indicated at 88 and at their other ends to the forked end of a draw pin 91 which is suitably connected to a stop pin 92 guided in a bracket 93 secured to the bearings 52. The connection between the draw pin and the stop pin 92 is such that upon the lower end of the brake lever 85 moving in a counter-clock-wise direction the stop pin 92 will be moved downward and against the action of a compression spring 94 positioned between the draw pin 91 and the stop pin 92 which normally tends to move the stop pin upward and into the path of the projecting arms of the angle pieces 79 and 81.

The bar 53 has three positions to which it is moved in the operation of the machine and is actuated by an operating arm 97 suitably connected to the bar 53 by a lever 98 pivotally secured to an eye 99 fastened to one end of the bar 53. (See Fig. 3.) The arm 97 is carried upon a bracket 101 secured to the container 17 and the position thereof is controlled by a quadrant 102 provided with three notches 103, 104, and 105, a notch for each position of the bar 53 and a retaining pawl 106 (see Fig. 3) controlled in the usual manner.

Means for evenly distributing cable 109 upon the take-up reel 72 of both units is indicated at 110 and consists of a reciprocable bar 111 equipped at each end with a pair of fingers 112 adapted to hold the cable while it is moved back and forth and wound upon the reels by a pinion secured to a shaft 113 meshing with a rack 114 secured to the bar 111. The shaft 113 is rotated first in one direction and then the other by suitable mechanism (not shown) connected to the main driving shaft 18. A plurality of pulleys 115—115 suitably supported act as guides for the cable in its travel from the supply reel 72 into the paint container 17 where it receives a coating of paint and then to the take-up reel 72. After passing around the guide pulley 115 located at the bottom of the paint container 17 the cable passes through an excess paint removing device 120 which is mounted at the upper right-hand corner of the container and just below the cover 121 thereof. The device 120 is connected with the compressed air line 122 controlled by the valve 123. Secured to the container is a bracket or support 124 provided with a depression 125 for the reception of the device 120. The surplus paint removing device 120 consists of two sections 127 and 126 hinged at 130 and held closed by a thumb nut and bolt 131. Section 127 is fitted with a stud 132 which passes through the bracket 124 and an opening in the container 17 and is secured to the bracket 124 on the outside of the container by a thumb nut 133. The air line 122 connects with a passage 134 in the bracket 124 which in turn connects with a passage 138 in the section 127. The passage 138 connects with the passage 139 in the section 126 of the device 120. Suitable gaskets 140 are fitted between the sections 126 and 127 and the bracket 124 and the section 127 to prevent any leakage of air where the air passages connect. Formed in the sections 126 and 127 at right angles to the passages 138 and 139 and connecting therewith are passages 141 and 142. Formed in the contacting surfaces of the sections 126 and 127 for the greater portion of their length are depressions 143 and 144 which together form a passage 145 through the device 120 for the cable 109. In the drawings flat switchboard cable has been shown and the passage 145 formed by the depressions 143 and 144 is of the same cross-section only enlarged so that a suitable space is allowed between the surface of the cable and the wall of the passage 145. If cable circular in cross section is to be operated upon, the passage 145 will be circular to correspond. Connecting the passage 145 formed by the depressions 143 and 144 with the passages 141 and 142 are a plurality of comparatively fine passages 146 formed at such an angle that all are directed at the passing cable (see Fig. 5). As shown in Fig. 6, the passages 146 are also formed at a suitable angle in a downward direction which acts to wipe the excess paint off the cable which is moving in the opposite direction. The passages 146 will in all cases be formed at an angle which best suits the cable being operated upon. Positioned at the top of the surplus paint removing device 120 and suitably secured in an opening formed in the sections 126 and 127 is a polisher 148 within which the cable snugly fits. The passage 145 formed by the depressions 143 and 144 is of such a size that it will take care of a plurality of cables of the same cross sectional shape; the only change required in the device 120 when another size cable is to be operated upon is to change the polisher for one that fits the cable. Positioned above the cover 121 of the container 17 is an auxiliary surplus paint remover 150 comprising a clamping device adapted to clamp burlap 151 or any suitable material around the cable to wipe it a second time before being wound on the take-up reel.

The operation of the machine is as follows:

The starting of the motor 16 causes the main driving shaft 18 to transmit motion to the shaft 35 and the shaft 35 in turn causes the shaft 38 to transmit power to both units 10 and 11 of the machine through the previously described gearing, thereby constantly driving the driving sections 49 and 50 of the friction clutches 47 and 48. Suitable gearing and mechanism as previously described interposed between the shafts 18 and 113 constantly operates the cable distributors 110 for both units 10 and 11. The mixing and stirring member 24 is being constantly driven from the shaft 18 as described before, and the pump 27 may be set in action when needed by operating the clutch 28 through the handle 29. As shown in the drawings, the operating arm 97 is locked at the notch 103 in the quadrant 102 and consequently the bar 53 has been moved to the right. During this movement the cam slot 57 and the pin 59 have cooperated to move the driven part 46 of the clutch 48 into engagement with the driving part 50 thereof, thereby causing the reel spindle 44 to be driven. At substantially the same moment that the pin 59 is moved to engage the clutch 48 the stop pin 92 is moved downward to clear the bottom end of the radial arms of any angle piece 81 or of the angle piece 79, depending upon the position of the brake pulley 70, thereby allowing the spring 80 to release the brake bands 73 from the brake pulley 70. As shown in the drawings, the cam slots 56 and 57 are so formed in the bar 53 with respect to each other that when the cam slot 57 is moving the pin 59 to cause the engagement of the clutch 48 and releasing the brake associated therewith, the cam slot 56 is moving the pin 58 to cause the disengagement of the clutch 47 and operating the brake associated therewith and vice versa. With the spindle 44 acting as the take-up spindle and driving the take-up reel 72 the spindle 43 acts as a support for the supply reel 72 and the stop pin 92 associated therewith causes the brake to be operated to keep the supply reel from overrunning or supplying the cable faster than it is taken up by the take-up reel. When the take-up reel 72 has drawn all the cable from the supply reel 72 and through the paint container 17, the operating arm 97 is moved up and locked at the notch 104, which movement, due to the formation of the cam slots 56 and 57 in the bar 53 and their relation to each other, disengages the clutch 48 and applies the brake to the take-up spindle 44 through the movement of the pin 59 without disturbing the condition of the spindle 43. At this time both spindles are idle and their respective brakes applied. The filled up reel 72 is removed from the spindle 44 and a reel of unpainted cable is positioned thereon and locked thereto by the stud 71 on the brake pulley 70 entering a suitable opening in the reel. To prevent the reel from moving in a horizontal direction off the spindle during the operation of the machine, the spindles are each provided with a circular groove 154 near their outside ends adapted to hold a spring locking pin 155. The reel which acted as a supply reel before now becomes the take-up reel for the cable wound on the supply reel just positioned upon the spindle 44.

The brakes being applied at the time of positioning, a reel of unpainted cable upon either spindle facilitates the locking of the reel to the brake pulley due to the locking stud 71 being held steady while the operator is inserting it into a suitable opening provided therefor in the reel. After positioning and locking the reel of unpainted cable upon the spindle 44 the free end of the cable is led therefrom and guided to and through the container 17 and secured to the take-up reel 72 upon the spindle 43, which reel has just been emptied. The guide pulley 115 located between the spindles 43 and 44 is only used when the spindle 44 is being used as a supply spindle as just described. The machine is now set in motion by moving the operating arm 97 upward and locking it at the notch 105, which movement moves the bar 53 to the left, thereby releasing the brake associated with the spindle 43 and engaging the clutch 47 to drive the spindle 43, the brake associated with the spindle 44 being left applied. The movement of the bar 53 to the left reverses the result of moving it to the right, as described in the beginning of this description of operation. By this arrangement of using alternately either of the spindles 43 and 44 for supply or take-up purposes the efficiency of the machine is increased, since the change of reels is reduced to one change per length of cable painted.

As the cable is drawn from the container 17 blasts of air directed at the surface of the cable by the surplus paint removing device 120 functions to wipe from the cable the surplus paint adhering thereto.

What is claimed is:

1. In a machine for working and handling strands, supply and take-up reels for the strand, spindles adapted to serve either as supply or take-up reel spindles, means for causing the strand to move past a predetermined point in the same direction while using either reel as a take-up, and mechanism associated with said spindles for driving and controlling them.

2. In a machine for working and handling strands, supply and take-up reels for the strand, spindles adapted to act alternately as supply or take-up reel spindles, means for causing the strand to move past a predetermined point in the same direction while using either reel as a take-up, and mechanism associated with said spindles for alternately driving and controlling them.

3. In a machine for working and handling strands, supply and take-up reels for the strand, spindles adapted to serve either constantly or alternately as supply or take-up reel spindles, means for causing the strand to move past a predetermined point in the same direction while using either reel as a take-up, and mechanism associated with said spindles for driving and controlling them.

4. In a machine for working and handling strands, supply and take-up reels for the strand, spindles adapted to act alternately as supply or take-up reel spindles, means for causing the strand to move past a predetermined point in the same direction while using either reel as a take-up, mechanism associated with said spindles for alternately driving and applying a braking force thereto, and actuating means for said mechanism.

5. In a machine for working and handling strands, supply and take-up reels for the strand, spindles adapted to serve either as supply or take-up reel spindles, mechanism associated with said spindles adapted to drive one or the other of said spindles or to disengage the drive from both spindles and apply a braking force thereto, means for causing the strand to move past a predetermined point in the same direction while using either reel as a take-up, and actuating means for said mechanism.

6. In a machine for working and handling strands, supply and take-up reels for the strand, spindles for said reels, a clutch mechanism connected with each of said spindles, driving means connected with the driving member of each of said clutches, and means for causing the strand to move past a predetermined point in the same direction while using either reel as a take-up, and an actuator associated with the driven members of said clutches adapted upon operation to cause the disengagement of one of said clutches and simultaneously the engagement of the other whereby said spindles may be used alternately for supply and take-up purposes.

7. In a machine for working and handling strands, supply and take-up reels for the strand, spindles for said reels, a clutch mechanism connected with each of said spindles, driving means connected with said clutches, braking means associated with each of said spindles and clutches, an actuator for said clutches and said braking means adapted upon operation to cause the disengagement of one of said clutches and the application of the braking means and simultaneously the engagement of the other clutch and the release of the other braking means whereby said spindles may be used alternately for supply and take-up purposes, and means for causing the strand to move past a predetermined point in the same direction while using either reel as a take-up.

8. In a machine for working and handling strands, supply and take-up reels for the strand, spindles for said reels, means for causing the strand to move past a predetermined point in the same direction while using either reel as a take-up, a clutch mechanism connected with each of said spindles, driving means connected with each of said clutches, braking means associated with each of said spindles, and an actuator adapted in two positions to cause the engagement or disengagement of either clutch and simultaneously the application or releasing of either braking means and in another position thereof to cause the disengagement of both clutches and simultaneously the application of the braking means to both spindles.

9. In a machine for handling strands, a plurality of means for mounting supply and take-up reels interchangeably, means to actuate same, and means for guiding the strand past a predetermined point in the same direction from either of said plurality of mounting means.

10. In a machine for handling strands, processing means requiring uni-directional motion of the strand therethrough, a plurality of means for mounting supply and take-up reels interchangeably, means to actuate same, and means for guiding the strand past a predetermined point in the same direction from either of said plurality of mounting means.

11. In a machine for handling strands, processing means requiring uni-directional motion of the strand therethrough, spindles for mounting reels for supply and take-up interchangeably, means to actuate same, and means for causing said strand to pass through said processing means in the same direction from either spindle.

12. In a machine for handling strands, supply and take-up spindles, means to rotate the spindles, and guiding means associated with said spindles to maintain the same direction of motion of the strand as to a predetermined point while using either spindle to act as take-up spindle, and also to maintain the direction of rotation of the spindles.

13. In a machine for handling strands, supply and take-up reels, means to rotate the reels, and a plurality of guiding means respectively associated with said reels to maintain direction of motion of the strand as to a predetermined point while using either reel as a take-up and also while maintaining the direction of rotation of said reel.

14. In a machine for handling strands, a plurality of spindles, means to rotate said spindles, and a plurality of rotatable idlers respectively associated with said spindles for rendering the spindles interchangeably supply and take-up spindles while maintaining unchanged the direction of rotation of said spindles and also the direction of motion of the strand as to a predetermined point.

15. In a machine for handling strands, supply and take-up reels, means for actuating said reels, and a plurality of rotatable idlers, selective use of said idlers causing a reversal of function of the reels while maintaining unchanged the direction of rotation of said reels and also the direction of motion of the strand as to a predetermined point.

16. A method of feeding a strand onto and off of two spools rotating in a predetermined direction, consisting in alternately feeding the strand onto the peripheral surface of each spool at a point diametrically opposed to that at which the strand is fed off of said spool, and guiding the strand in the same direction past a predetermined point when feeding from either spool.

In witness whereof, we hereunto subscribe our names this 26th day of November A. D., 1921.

FREDERIC S. KOCHENDORFER.
HELMER J. BOE.